United States Patent [19]

Noda et al.

[11] Patent Number: 4,695,730

[45] Date of Patent: Sep. 22, 1987

[54] LOCAL RADIATION EXPOSURE ALARM APPARATUS

[75] Inventors: Kimio Noda, Ibaraki; Kiyoshi Ozeki, Chiba; Hiroaki Furukawa, Ibaraki; Katsunori Watai, Kanagawa, all of Japan

[73] Assignees: Doryokuro Kakunenryo Kaihatsu Jigyodan; Ohyo Koken Kogyo Co., Ltd., both of Tokyo, Japan

[21] Appl. No.: 769,793

[22] Filed: Aug. 26, 1985

[30] Foreign Application Priority Data

Sep. 17, 1984 [JP] Japan ................... 59-192497

[51] Int. Cl.$^4$ .............................................. G01T 1/24
[52] U.S. Cl. .................................................. 250/370
[58] Field of Search ..................... 250/370 R, 370 F

[56] References Cited

U.S. PATENT DOCUMENTS

| | | | |
|---|---|---|---|
| 3,878,108 | 4/1975 | Burgkhardt et al. | 250/472.1 |
| 3,983,717 | 10/1976 | Collica et al. | 250/484.1 |
| 4,197,461 | 4/1980 | Umbarger et al. | 250/370 F |
| 4,320,393 | 3/1982 | Engdahl | 250/388 |
| 4,372,680 | 2/1983 | Adams et al. | 250/338 |
| 4,461,952 | 7/1984 | Allemand et al. | 250/370 F |
| 4,484,076 | 11/1984 | Thomson | 250/370 F |
| 4,489,315 | 12/1984 | Falk et al. | 250/370 F |

FOREIGN PATENT DOCUMENTS 2641039 3/1978 Fed. Rep. of Germany ... 250/370 F

Primary Examiner—Craig E. Church
Assistant Examiner—John C. Freeman
Attorney, Agent, or Firm—Browdy and Neimark

[57] ABSTRACT

Local radiation exposure alarm having a radiation detector used in the course of operations in nuclear power plant, a radiotherapeutic center for treatment for cancer, etc., a preamplifier for transmitting with an excellent S/N ratio a detected output signal from said detector, and a measuring unit measuring an exposure and provided with an alarm operating when the exposure exceeds a set permissible dose, and in which these detector, preamplifier and measuring unit are connected together electrically. The detector unit is shaped in a ring to be set on a finger or a toe, has a semiconductor element highly sensitive to radiation such as gamma rays incorporated therein so as to be sufficiently protected from vibrations and moisture, and is connected to the preamplifier unit through a lead wire. The preamplifier unit is provided with a fitting easy to set on and remove from an arm or the like and is connected electrically to the measuring unit also through a lead wire, and the measuring unit has a display and the alarm. The preamplifier unit has a space for holding the detector therein, and the measuring unit has a space for holding the preamplifier with the detector.

6 Claims, 3 Drawing Figures

LOCAL RADIATION EXPOSURE ALARM APPARATUS

FIELD OF THE INVENTION

The invention pertains to the field of monitor and alarm technology, and makes it possible to measure the exposure of a local part of a human body such as a finger tip to radiation at any time and to give an alarm therefor in the course of operation in nuclear power plants, medical institutions, etc.

DESCRIPTION OF THE PRIOR ART

As is generally known, great importance has been attached recently to the protection of personnel from exposure to radiation in the operations in nuclear power plants or in medical institutions such as radiotherapeutic centers.

Although double or triple biological shields are provided as a basic structure in plant facilities in which various operations are conducted in the working areas subjected to radiation exposure, it is impossible at present to dispense with manual operations in maintenance, inspection or repair works.

In such operations it is usual to take measures to protect the whole body of an operator from the exposure. However, it should be noted that most operations in regions susceptible to the exposure to radiation are generally performed by a local part of a human body such as the fingers, and that the exposure of the local part such as the fingers to radiation is remarkably large compared with that of the other part of the body.

The protective wear is usually employed as a basic means to protect the operator from exposure in the regions susceptible to the exposure to radiation, and means of monitoring and measuring a radiation dose or an amount of exposure of the whole body are taken so as to prevent excessive exposure.

Among dosimeters with an alarm used for the whole body, there is a portable type. The dosimeter of this type is provided with a meter for measurement and an alarm which warns any user who has been exposed to radiation exceeding an amount beyond the permissible setting limit by means of a buzzer or the like.

The above-described type of dosimeter for the operator's whole body is put, for instance, on the portion of breast or waist of clothes of the operator. This kind of a dosimeter can not measure the exposure of a local part of the body such as the fingers to radiation for providing a warning. There is a large possibility that the local part such as the fingers has already been exposed to a large amount of radiation beyond the permissible amount when the buzzer of the dosimeter gives warning of the exposure to ordinary radiation exceeding a predetermined permissible amount.

In order to make up for the deficit of the dosimeter, a so-called film badge is often put on a predetermined local part of an operator's body. However, this device requires post-exposure treatment for detection; thus, it is impossible for an operator to monitor it for measurement in actual operations on real time.

There is another mode of measurement in which a so-called film ring, a TLD ring (thermo-luminescence dosimeter) or the like is put on the local part such as fingers, and after operations, it is subjected to post-exposure treatment to measure a radiation dose. A film ring requires accurate development and a subsequent measurement therefrom. As for the thermo-luminescence dosimeter a measuring element is taken out and subjected to a heat treatment at a temperature of about 400° C. so as to measure a quantity of fluorescence emitted from $CaSO_4$ when it is heated, and the radiation dose is measured therefrom. The after-treatment described above needs much complicated processes and a rather long time of several hours to several days. Consequently, the detection and monitoring of the radiation dose are not conducted in a real time for an operator. Thus, it is impossible for this type of dosimeter to detect and monitor the dose simultaneously with actual operations, and this brings forth such a disadvantage that a measurement after the actual operations can not detect an exposure exceeding a predetermined amount during the operations.

SUMMARY OF THE INVENTION

Taking it up as a technical task to solve the above-described problem of the prior art, the invention of the present application aims to measure and monitor the exposure to radiation of the whole body on a constant and real-time basis and, in particular, a local part thereof such as the fingers or toes in the course of unavoidable operations in dangerous regions in which the exposure to radiation occurs. The invention of the present application further aims to furnish an excellent local radiation exposure alarming apparatus, and to prevent excessive exposure of the local part of a human body, with consequent reduction of the exposure dose over the whole body. Thus many improvements are made on the safety of the operations, on the level of a working program and control, and on the working efficiency because of an enhanced freedom of mind for the operator, with a sense of security, during operations in the regions of exposure to radiation.

BRIEF DESCRIPTION OF THE DRAWINGS

The drawings are illustrations of one embodiment of the invention applied herein, of which.

DETAILED DESCRIPTION OF THE PREFERRED EMBODIMENT

Figure 1:
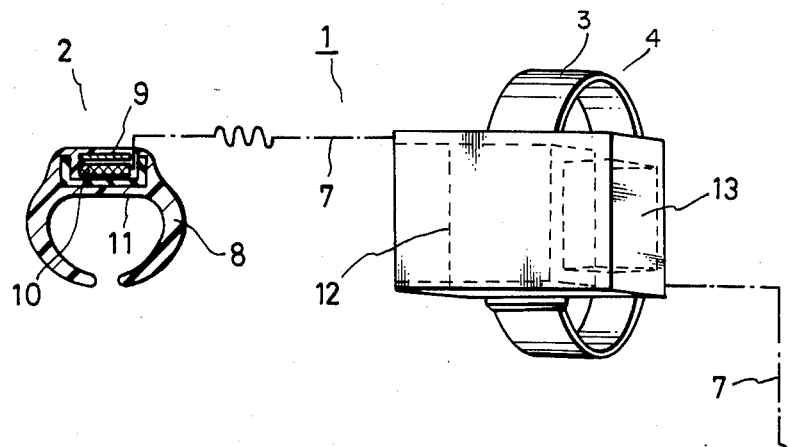
FIG. 1 is a perspective view showing the sections of the parts of a detector, a preamplifier and a measuring unit, relating to the connections thereof.
Figure 2:
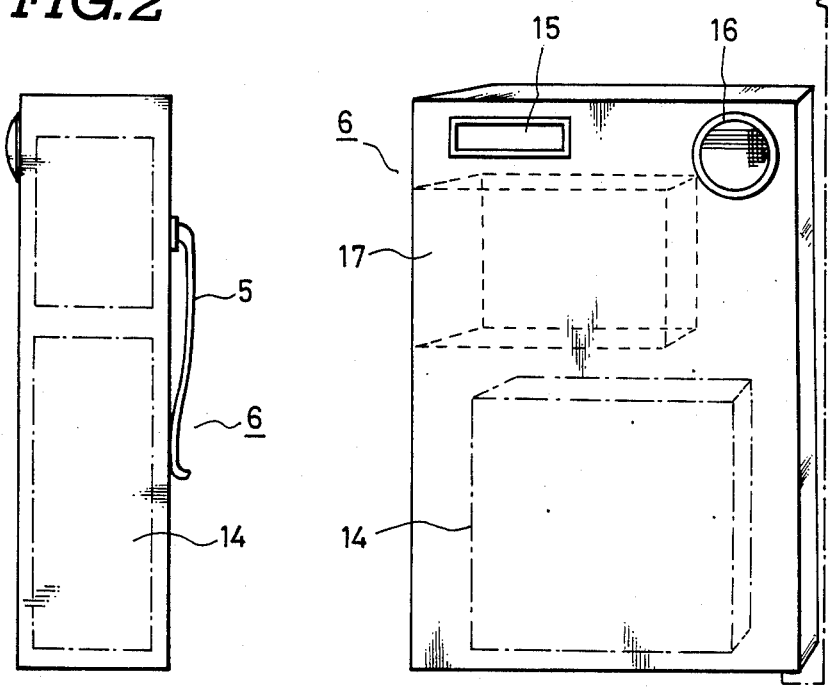
FIG. 2 is a side view of the measuring unit.

Next, a description will be made hereunder on one embodiment of the invention of the present application with reference to drawings.

A local radiation exposure warning apparatus 1 according to the present invention comprises three units as shown in Figure. Concretely, it comprises a detector unit 2 formed in the shape of a finger ring so that it can be easily put on and removed from a finger of an operator, a preamplifier unit 4 provided integrally with a strap 3 which enables the preamplifier unit 4 to be put on the wrist of an arm of the operator (from the outside of his clothes) and removed therefrom, and a measuring unit 6 which can be put on the part of a breast pocket or the waist of protective wear of the operator with a clip 5.

These three units of the apparatus are connected in series electrically, with the preamplifier unit 4 as the center of connection, by doubly-shielded electric wires 7 of a flexible type which ensures performing various operations smoothly.

Next, the structure and mechanism of each of these devices will be described separately. First, the detector unit 2 has a construction in which a filter 9, a semiconductor element 10 and a cushion 11 are embedded in three integral layers in the main body 8 of the ring thereof.

The filter 9 is provided for improving the energy characteristic of the semiconductor element 10, and it is formed of Sn, Al, Pb, Cd, etc., for instance, so as to eliminate a bad effect such as noise pulses due to a humidity change or noise generation due to vibration of an electric wire between the semiconductor detector unit 2 and the preamplifier 4, the bad effect being caused by the mismatch between the number of pulses from the semiconductor detector unit 2 and that of X-rays in practice.

The semiconductor element 10 of the present embodiment, which functions highly sensitively to gamma rays of radiation, is formed of low bias voltage materials, such as CdTe, HgIz, GaAs and Si, for instance, and it is molded in said cushion material 11 which is made for instance of silicone rubber, embedded in the main body 8 of the ring, and connected to the end of the lead wire 7.

The semiconductor element 10 is likely to be easily damaged by moisture because of its physical properties, and a detected signal from gamma rays is very weak. In order to suppress noise and to obtain an excellent S/N ratio, therefore, the semiconductor element 10 is molded in the cushion material 11 and embedded integrally therewith.

When an operation is conducted in a region where there is a possibility of exposure to radiation, special protective wear is used, as described previously, so as to secure safety. The protective wear for this purpose is naturally of a covered-up type and causes much sweating during the operation, and thus moisture is produced from the sweat. In the present embodiment, a method of hermetically molding the detector with silicone rubber is adopted for preventing the moisture thus produced from permeating into the detector. The molding is not always required, therefore, when a mode of design with a moisture-proof IC is employed.

The mode of design of the present embodiment in which the detector is molded with silicone rubber 11 and embedded in the main body of the detector unit provides sufficient moisture resistance, so as to dampen the vibrations due to the unsteadiness of the device.

The molding of the semiconductor element 10 with silicone rubber 11 serves as a kind of vibration-proof shielding as described above, and moreover, the application of the double-shielding method enables the prevention of the occurrence of noise due to vibrations, thus realizing an excellent S/N ratio.

The double-shield design preferably employed in the present invention enables also the reduction of the effect of electromagnetic induction.

The electric wire 7 transmitting a weak detection signal from the semiconductor element 10 to the preamplifier unit 4 is also formed of a doubly-shielded coaxial cable to reduce noise, whereby the false transmission of a detection pulse due to gamma rays is prevented.

The preamplifier unit 4 is provided for amplifying the detection signal sufficiently for the aforesaid measuring unit 6, in addition to the above-stated mechanisms. It is provided so that the weak detection signal detected by said semiconductor element 10 can be transmitted noiselessly with an excellent S/N ratio. This preamplifier unit 4 is of a high gain FET charge-sensitive amplifier type. The preamplifier unit 4 has a prescribed stability against vibrations and moisture like the aforesaid detector 2, and is made to be of a small-sized wrist type enabling it to be attached on an arm with the strap 3 as described previously.

Therefore, the electric circuit section thereof may be molded with silicone rubber, for instance, in the same way as the above-described semiconductor element 10 and fixed and held in its case.

As to the electric wire 7 for the measuring unit 6, the same low-noise coaxial cable as for the lead wire 7 for connection with the semiconductor element 10 is employed therefor.

According to the above-described construction, the effective distance between the detector and the measuring unit can be extended for instance by as much as 1.5 meters, a distance long enough to ensure the freedom of operations, in the present embodiment. In the conventional apparatus the effective distance can be extended generally only by several centimeters, which results in poor freedom of operation.

Inside the preamplifier unit 4, an accommodating section 12 is formed so that the detector unit 2 can be easily placed in and taken out of it with an appropriate clamp.

The accommodating section 12 is positioned and spaced, of course, so as not to interfere with an electric circuit section 13.

A circuit section 14 of the measuring unit 6, which is designed properly, is connected to the preamplifier unit 4 through the electric wire 7, and the measuring unit 6 is further provided, on the flank of its casing, with a display 15 which displays the amount of the detected exposure to gamma rays of radiation digitally or with brightness or color, and also with a buzzer 16 as an alarm generator so that warning can be given when the exposure dose exceeds a set permissible value.

Figure 3:
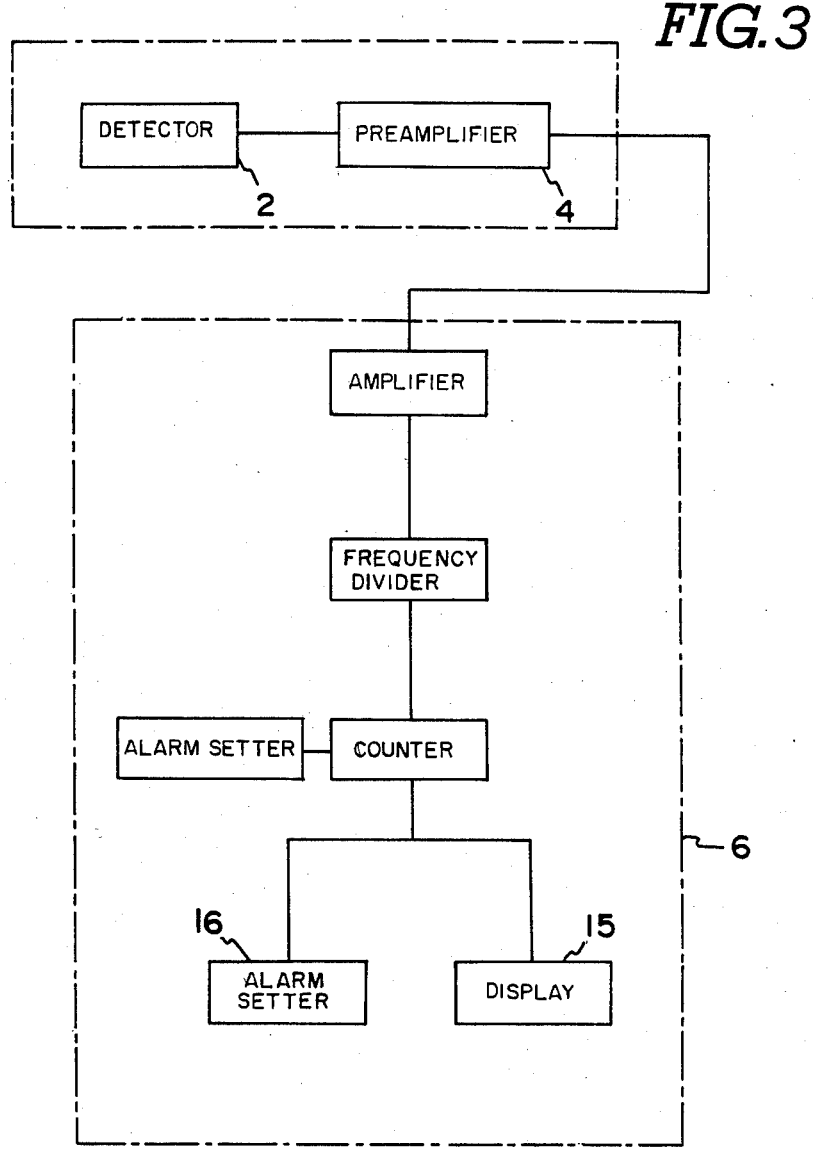
FIG. 3 is a block diagram of a circuit thereof.

A circuit for controlling this mechanism is well formed on the basis of a known conventional circuit design, and the block diagram thereof is such, for instance, as shown in FIG. 3.

Inside the above measuring unit 6, an accommodating section 17 is provided, with an appropriate openable cover, so that the aforesaid preamplifier unit 4 can be easily put in and taken out of it.

According to this construction, the function of detecting and measuring gamma rays is maintained satisfactorily, without being impaired at all, even when the preamplifier unit 4 is put in the accommodating section 17 of the measuring unit 6 after the detector unit 2 is held in the accommodating section 12 of the preamplifier unit 4, as described previously. Therefore, the apparatus can be employed as an exposure warning apparatus of a three-units-in-one type for the whole body, and in this case, it can be put on the part of a pocket or the waist of protective wear, in the same way as described previously, by using the clip 5 provided on the back surface of the casing thereof. The three devices constituting said apparatus can be separated and set respectively in a prescribed manner, of course, to be employed as a local exposure alarming apparatus, as occasion demands.

The embodiment constructed as described above is employed in the following way. When operations for prescribed inspections etc. are performed by an operator inside the facilities of a nuclear power plant or a medical institution such as a radiotherapeutic center, the detector unit 2 with its ring-shaped main body 8 is put easily on a finger or the like, and the preamplifier unit 4 is set with its strap 3 put around a desired position of for instance an arm, over the protective wear, while the measuring unit 6 is set for instance on a breast pocket of said protective wear, by using the clip 5 provided on the back surface of the casing thereof, so that the display 15 thereof can be watched with ease. Then, a switch of the measuring unit 6 is turned on to put a main amplifier and the preamplifier unit 4 in the state of operation, and a prescribed operation is conducted.

Accordingly, the detector unit 2, the preamplifier unit 4 and the measuring unit 6 are all in a reads state at this time, and the freedom of the operation is not hampered at all. In addition, since the aforesaid three units are connected by the flexible electric wires 7, the operations thereof are not affected at all by bending and stretching and other changes in the posture of the operator in his work, thus the function of the exposure warning apparatus 1 being secured completely.

When the operator is exposed to gamma rays, these are detected immediately by the semiconductor element 10 of the detector unit 2 of the local exposure warning apparatus 1, and a weak detection signal delivered therefrom is sent through the electric wire 7 to the preamplifier unit 4, whereby it is amplified. The amplified signal is further sent through the electric wire 7 to the measuring circuit 14 of the measuring unit to be processed thereby. In the circuit of a block diagram shown in FIG. 3, the detection signal is subjected to the comparative operation by a counter through the intermediary of a setter, in which it is determined automatically and constantly whether the amount of exposure is above or below a predetermined permissible value. The dose of exposure thus detected is displayed in the display 15 in a prescribed manner, and thus the operator can monitor visually the amount of exposure during his operation on a real-time basis at all times and as occasion demands.

In a manual repair job for piping, apparatuses, etc., in particular, the visual monitoring thus conducted can serve as a satisfactory means of confirming safety, and the operator can devote oneself to his operation as long as the buzzer 11 of the alarm does not sound.

When there occurs an exposure to gamma rays exceeding a predetermined permissible amount during an operation, the detection signal thereof is processed by the counter of the measuring circuit of FIG. 3 and the display 15 indicates that the dose of exposure exceeds the predetermined amount, while the buzzer of the alarm 15 is made to sound automatically to inform the operator of the excess of the exposure. Then the operator can know the dose of exposure by checking the display 15 visually, and thus he can take refuge properly or take necessary measures.

In this case, the filter 9 of the detector unit 2 serves to make uniform the sensitivity of the semiconductor element 10 to gamma rays of different energy, and the semiconductor element 10 fulfills a sort of vibration-proof function because of its being molded integrally with silicone rubber 11, thus preventing the occurrence of noise due to vibration. Moreover, the double-shield structure of the element 10, as described previously, enables the maintenance of an excellent S/N ratio by electromagnetic shielding, and consequently a detection signal free from noise can be transmitted to the preamplifier unit 4 through the electric wire 7. The preamplifier unit 4, in its turn, can amplify the input signal further excellently in the noiseless state and transmits same to the measuring circuit 14 of the measuring unit 6.

Since the preamplifier unit 4 is also doubly shielded with silicon rubber in the present embodiment, the S/N ratio is kept excellent in the entire circuit, and the noiseless state is maintained.

In addition, since the whole of the apparatus is constructed to be moistureproof by double shielding, the deterioration of function due to moisture can be prevented even with the protective wear of covered-up type employed.

When the apparatus cannot be operated as the above-described local exposure warning apparatus in which the detector unit 2, the preamplifier unit 4 and the measuring unit 6 are set separately at prescribed positions respectively, by such various compelling reasons as the need of being equipped with working tools or forming a buffer against equipment or apparatuses, it can be used as a two-in-one-unit apparatus, for instance, by putting the detector unit 2 into the accommodating section 12 of the preamplifier unit 4, or as a three-in-one-unit apparatus, i.e. the exposure alarming apparatus for the whole body, by putting the preamplifier unit 4 with the detector unit 2 held integrally therein into the accommodating section 17 of the measuring unit 6. The apparatus can be restored from the state of the three-in-one-unit exposure warning apparatus for the whole body to the state in which the three units are separate from one another or to the state in which two devices in one unit and the third are separate from each other, and thus the freedom of employment of the present apparatus in these modes is always secured.

The practical modes of the invention of this application are not limited, of course, to those of the above-described embodiment. For instance a self-function-maintenance device warning the breakdown of lead wires or cables can be provided.

Moreover, the apparatus of the present invention can be used as a telemetering apparatus for measuring the dose of a minute portion of beam-like radiation, or as a detector for investigating a leakage of radiation.

According to the invention of this application, as described above, the exposure to radiation of an extremity of the human body, such as fingers and toes, which is likely to be exposed to a large dose of radiation in particular can be measured and monitored on a real-time basis in the course of operations which are performed by engineers, doctors, nurses or the like in regions liable to be exposed to radiation in a nuclear power plant, a radiotherapeutic institution or the like. This brings forth an excellent effect that such a necessary safety measure can be exercised by an operator taking refuge in time from the state of the exposure to radiation, to keep his exposure below desired level in the course of his operation.

Moreover, the present invention has the effects that a working program and a working control can be effectuated in full consideration of safety, and that countermeasures against the leakage of radiation can be taken immediately.

Furthermore, it has the effect that a safety measure can be taken before the dose of exposure of the whole body becomes excessively large, since the dose of exposure of an extremity such as fingers can be detected and measured immediately.

In this way, it has also the effect that not only the safety of the operator can be secured, but also an operation of measuring the exposure and an improvement in accuracy can be performed simply, thus laborsaving and cost reduction being enabled.

While the detector, the preamplifier and the measuring unit are separate in the apparatus, the preamplifier unit can accommodate the detector unit, and the measuring unit can accommodate the preamplifier unit. This construction of the apparatus brings forth the effect that it has such a freedom of flexible employment that it can be used as an exposure warning apparatus which can take a two-in-one-unit mode or a three-in-one-unit mode for measuring exposure to a part or the whole of a human body.

The construction of the apparatus in which the preamplifier unit is interposed between the detector unit and the measuring unit and these units are connected by flexible electric wires has such an excellent effect that the detection and measurement of the exposure of an extremity such as a finger can be performed while ensuring freedom of operations and increasing the efficiency thereof.

The fact that the semiconductor element of high sensitivity is incorporated in the detector enables the detection of the exposure of an extremity of the body in which the exposure to radiation tends to occur most frequently, such as when piping or apparatuses are handled by fingers and the like. Since the interposed preamplifier is able to amplify a weak detection signal from the semiconductor element of the detector unit and transmit a noiseless signal of high S/N ratio to the measuring unit an effective detection distance can be extended so much as by 1.5 meters in the apparatus of the present invention while it is only several centimeters in the conventional apparatuses. These advantages bring forth excellent effects that the freedom of operations can be ensured to a large extent and that a smooth motion of an extremity such as fingers can be secured.

Moreover, there is the effect, in particular, that the operability of an operator is maintained, since it can be avoided that the weight of the three devices is concentrated on some position in the detection and measurement of a local exposure, by the separate setting of these devices.

The measuring unit is equipped with a display and an alarm, and when an exposure exceeds a predetermined permissible dose, said alarm makes a buzzer or the like sound immediately to warn an operator, enabling him to take a safety measure immediately. Accordingly, he can devote himself to a prescribed operation until the alarm warns him. In addition to this effect, the measuring unit has another effect that the exposure dose can be checked visually in the display as occasion demands even when the alarm does not operate since the exposure is below the permissible dose.

As to the detector unit and the preamplifier unit, they can be made light by the application of the latest precision engineering and electronics, and this brings forth an excellent effect that the apparatus formed thereof provides an improvement in operability.

What is claimed is:

1. An exposure alarm apparatus comprising:
    a detector unit having a semiconductor element sensitive to gamma radiation, a filter for improving an energy characteristic of said semiconductor element, and a cushion material for embedding therein said semiconductive element, said detector unit being formed in the shape of a finger ring having a body portion so that said detector unit can be removably adapted to a finger of an operator, said semiconductor element, filter and cushion material being embedded in said body portion;
    a preamplifier unit electrically connected to said semiconductor element, said preamplifier unit having first means for selectively encasing said detector unit, and a strap for removably engaging said amplifier unit to the operator; and
    a measuring unit electrically connected to said preamplifier unit, said measuring unit having second means for selectively encasing said preamplifier unit, and a clip device for removably engaging said measuring unit to the operator.

2. An exposure alarm apparatus according to claim 1, wherein said cushion material is silicone rubber.

3. An exposure alarm apparatus according to claim 1, wherein said detector unit, said preamplifier unit and said measuring unit are electrically connected in series by doubly shielded electrically conductive flexible wires.

4. The apparatus of claim 1, said measuring unit including means for providing on a real time basis a signal for the operator when the radiation detected by said detector unit exceeds a predetermined amount.

5. The apparatus of claim 1, said measuring unit including means for displaying on a real time basis for said operator the exposure to radiation detected by said detector unit.

6. The apparatus of claim 5, said measuring unit including an alarm for warning said operator when the exposure dose exceeds a permissible value.

* * * * *